(12) United States Patent
Hatano

(10) Patent No.: US 6,940,803 B2
(45) Date of Patent: Sep. 6, 2005

(54) OPTICAL HEAD, RECORDING AND REPRODUCING APPARATUS AND SOLID IMMERSION LENS

(75) Inventor: Hiroshi Hatano, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 912 days.

(21) Appl. No.: 09/735,608

(22) Filed: Dec. 14, 2000

(65) Prior Publication Data

US 2002/0136144 A1 Sep. 26, 2002

(30) Foreign Application Priority Data

Dec. 15, 1999 (JP) .......................... P11-355902

(51) Int. Cl.[7] .............................................. G11B 7/135
(52) U.S. Cl. ........................... 369/112.23; 369/112.01; 369/13.33; 369/112.27; 369/112.28; 369/112.29; 369/272; 359/726; 359/731
(58) Field of Search ....................... 369/13.33, 112.01, 369/112.23, 112.27, 112.28, 112.29, 118, 112.12, 112.14, 112.24; 359/728, 731, 664, 729, 364, 351, 387, 727, 730, 822, 819, 356, 726; 356/4.02

(56) References Cited

U.S. PATENT DOCUMENTS

| | | | |
|---|---|---|---|
| 2,378,301 A | 6/1945 | Kaprellan | 359/731 |
| 3,059,113 A | 10/1962 | McHenry | 250/353 |
| 4,121,890 A | 10/1978 | Braun | 356/4.02 |
| 4,437,746 A | 3/1984 | Ikemori | 369/272 |
| 5,004,307 A | 4/1991 | Kino et al. | 359/356 |
| 5,125,750 A | 6/1992 | Corle et al. | 359/819 |
| 5,638,219 A * | 6/1997 | Medina Puerta et al. | 359/729 |
| 5,764,613 A | 6/1998 | Yamamoto et al. | 369/112.24 |
| 5,774,281 A | 6/1998 | Maeda et al. | 359/822 |
| 5,786,947 A | 7/1998 | Maeda et al. | 359/822 |
| 6,064,517 A * | 5/2000 | Chuang et al. | 359/364 |
| 6,169,637 B1 | 1/2001 | Tsunashima | 359/726 |
| 6,212,153 B1 * | 4/2001 | Chen et al. | 369/112.12 |
| 6,236,514 B1 * | 5/2001 | Sato | 359/664 |
| 6,256,154 B1 * | 7/2001 | Kubota et al. | 359/728 |
| 6,266,315 B1 * | 7/2001 | Lee et al. | 369/112.01 |
| 6,359,852 B1 * | 3/2002 | Ueyanagi | 369/118 |
| 6,831,886 B1 * | 12/2004 | Yamasaki et al. | 369/112.28 |

FOREIGN PATENT DOCUMENTS

JP 7-192280 7/1995

OTHER PUBLICATIONS

Reflecting Microoptical System, filed Nov. 25, 1999 as U.S. Appl. No.: 09/450,271.

* cited by examiner

*Primary Examiner*—William Korzuch
*Assistant Examiner*—Kim-Kowk Chu
(74) *Attorney, Agent, or Firm*—Morrison & Foerster LLP

(57) ABSTRACT

A recording and reproducing apparatus has an optical head that is provided with a laser light source for emitting light and a reflection converging optical system. The reflection converging optical system reflects light emitted from the laser light source, and converges the light on one point of a bottom surface of a solid immersion lens. Here, the reflection converging system has a first reflection surface for reflecting incident light; and a second reflection surface for further reflecting the light reflected by the first reflection surface and for converging the light onto the bottom the solid immersion lens.

15 Claims, 13 Drawing Sheets

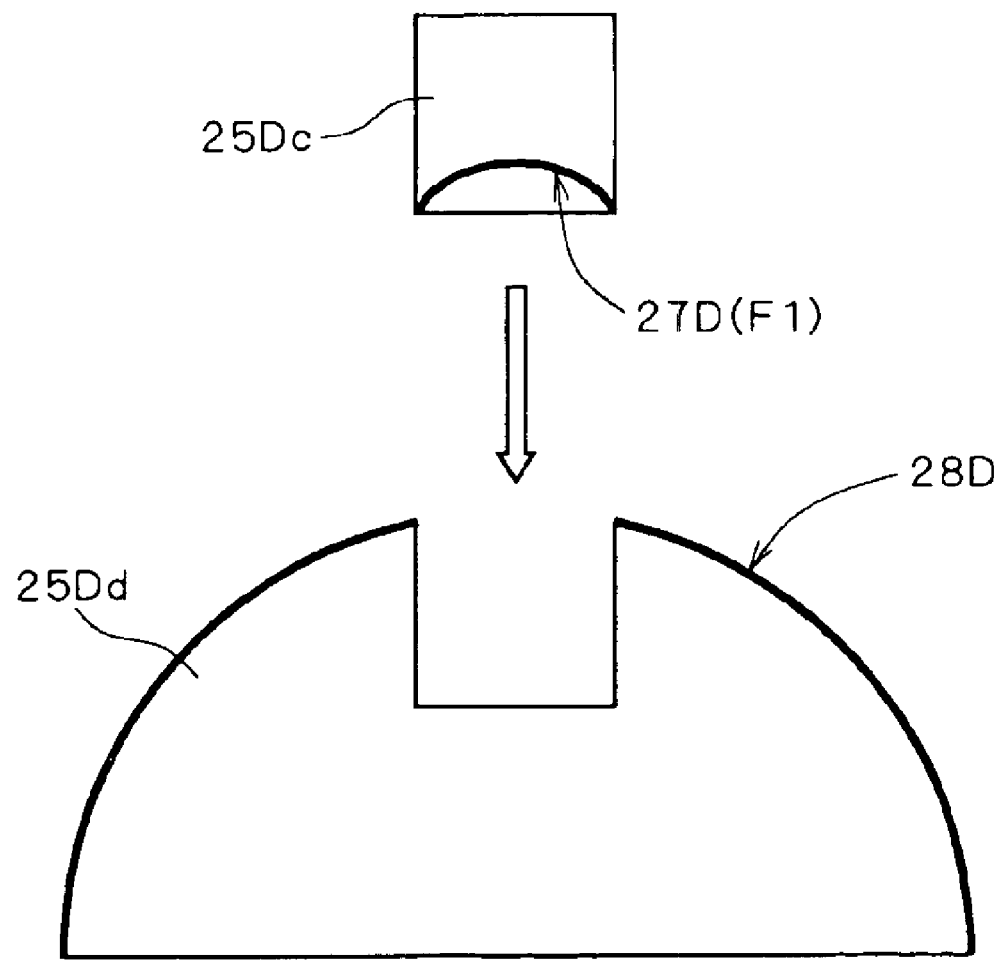
F I G . 1 1

OPTICAL HEAD, RECORDING AND REPRODUCING APPARATUS AND SOLID IMMERSION LENS

This application is based on application No. 11-355902 filed in Japan, the contents of which are hereby incorporated by reference.

BACKGROUND OF THE INVENTION

1. Field of the Invention

The present invention relates to an optical head and a solid immersion lens which can eliminate chromatic aberration, and provide a light beam having a fine spot diameter, and also concerns a recording and reproducing apparatus using such members.

2. Description of the Background Art

In recent years, for a technique to improve the information recording density in a digital recording medium that is capable of optical accessing, a technique utilizing near field lights has been developed.

In such a technique, solid immersion lens (SIL) are often used. This technique provides an arrangement in which a solid-state medium having a high refractive index is placed in the proximity of a focal point of a converged light beam in an optical head so that the light spot in the optical head is made further smaller. In the optical head of this type, a single objective lens is used and a light converging process utilizing the light refraction phenomenon is carried out.

However, in the case of the application of a plurality of wavelength in this type of optical head, when light is converged by the single objective lens as described above, a problem of "chromatic aberration" arises in which the lens fails to focus light rays having a plurality of wavelengths on the same spot.

In order to eliminate the problem of chromatic aberration, the optical microscope, etc. adopts a microscope-use objective lens which regulates chromatic aberration in a specific range of wavelengths such as a visible area by combining a plurality of lenses.

Moreover, with respect to optical recording heads, those that can deal with two wavelengths CD (wavelength 780 nm) and DVD (wavelength 635 nm) have been proposed. In this method, by utilizing the difference in numerical apertures of the two wavelengths, lights having the two different wave lengths are focused onto respective predetermined points, by changing the shape of the objective lens or inserting a holographic element depending on the aperture positions.

However, since the above-mentioned microscope lens is constituted by a plurality of combined lenses, the weight (or mass) tends to become great. Therefore, lenses of this type are not suitable for optical heads which need to move the lens.

Moreover, the above-mentioned technique which utilizes the difference in numerical apertures of two wavelengths, cannot be applied to a case in which there is no difference in the numerical apertures or the number of wavelengths (kinds) to be used is further increased. In other words, it is difficult to widely apply this technique to optical heads that deal with a plurality of wavelengths.

SUMMARY OF THE INVENTION

The first aspect of the present invention is directed to an optical head which has: a light source for emitting light; and a reflection converging optical system which includes a solid immersion lens essentially made of a light-transmitting medium, and reflects the light emitted from the light source and taken in the solid immersion lens to converge the light onto a boundary portion of the solid immersion lens, said reflection converging optical system comprising: a first reflection surface for reflecting the light that has been emitted from the light source and taken in the reflection converging optical system; and a second reflection surface for further reflecting the light reflected by the first reflection surface and for converging the light onto the boundary portion of the solid immersion lens.

In the first aspect of the present invention, the light that has been emitted from the light source is converged onto the boundary portion of the solid immersion lens through the reflection converging optical system; therefore, it becomes possible to eliminate the chromic aberration to the light. Moreover, since the incident light onto the optical system is reflected twice by the first reflection surface and the second reflection surface, and then converged onto the boundary portion of the solid immersion lens; therefore, it is possible to realize a greater numerical aperture, and consequently to obtain light rays that provide a finer spot diameter.

The second aspect of the present invention is directed to an optical head in which the light emitted from the light source is taken in the first reflection surface sideways with respect to a light-converging axis of the reflection converging optical system.

In the second aspect of the present invention, since the light emitted from the light source is taken in the first reflection surface sideways with respect to a light-converging axis of the reflection converging optical system, it is possible to reduce the size in the height direction, and consequently to make the optical head thinner.

The third aspect of the present invention is directed to an optical head in which the first reflection surface is formed on a surface of the solid immersion lens, and the second reflection surface is formed on a reflection member that is installed separately from the solid immersion lens.

In the third aspect of the present invention, since the first reflection surface is formed on a surface of the solid immersion lens without the need of installing a separate reflection member, it is possible to make the optical head smaller and thinner.

The fourth aspect of the present invention is directed to an optical head in which the first reflection surface and the second reflection surface are formed on the solid immersion lens.

In the fourth aspect of the present invention, since the first reflection surface and the second reflection surface are formed on a surface of the solid immersion lens without the need of installing separate reflection members, it is possible to make the optical head smaller and thinner, it is possible to make the optical head smaller and thinner.

The fifth aspect of the present invention is directed to an optical head in which the second reflection surface is formed on a cone-shaped concave section placed on the upper surface.

In the fifth aspect of the present invention, the second reflection surface is formed on a cone-shaped concave section placed on the upper surface. Therefore, it is possible to increase the numerical aperture at the time of converging light, and consequently to further miniaturize the spot diameter.

Moreover, the present invention is also directed to a recording and reproducing apparatus and a solid immersion lens.

Therefore, the objective of the present invention is to provide an optical head which can eliminate the chromic aberration even when light rays having a plurality of wavelengths are used so as to obtain light with a fine spot diameter, a solid immersion lens used for this purpose, and a recording and reproducing apparatus using these.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an explanatory drawing that shows another manufacturing method of the solid immersion lens 25D;

DESCRIPTION OF THE PREFERRED EMBODIMENTS

Referring to Figures, the following description will discuss preferred embodiments of the present invention.
<A. First Preferred Embodiment>
<Structure of Recording and Reproducing Apparatus>

Figure 1:
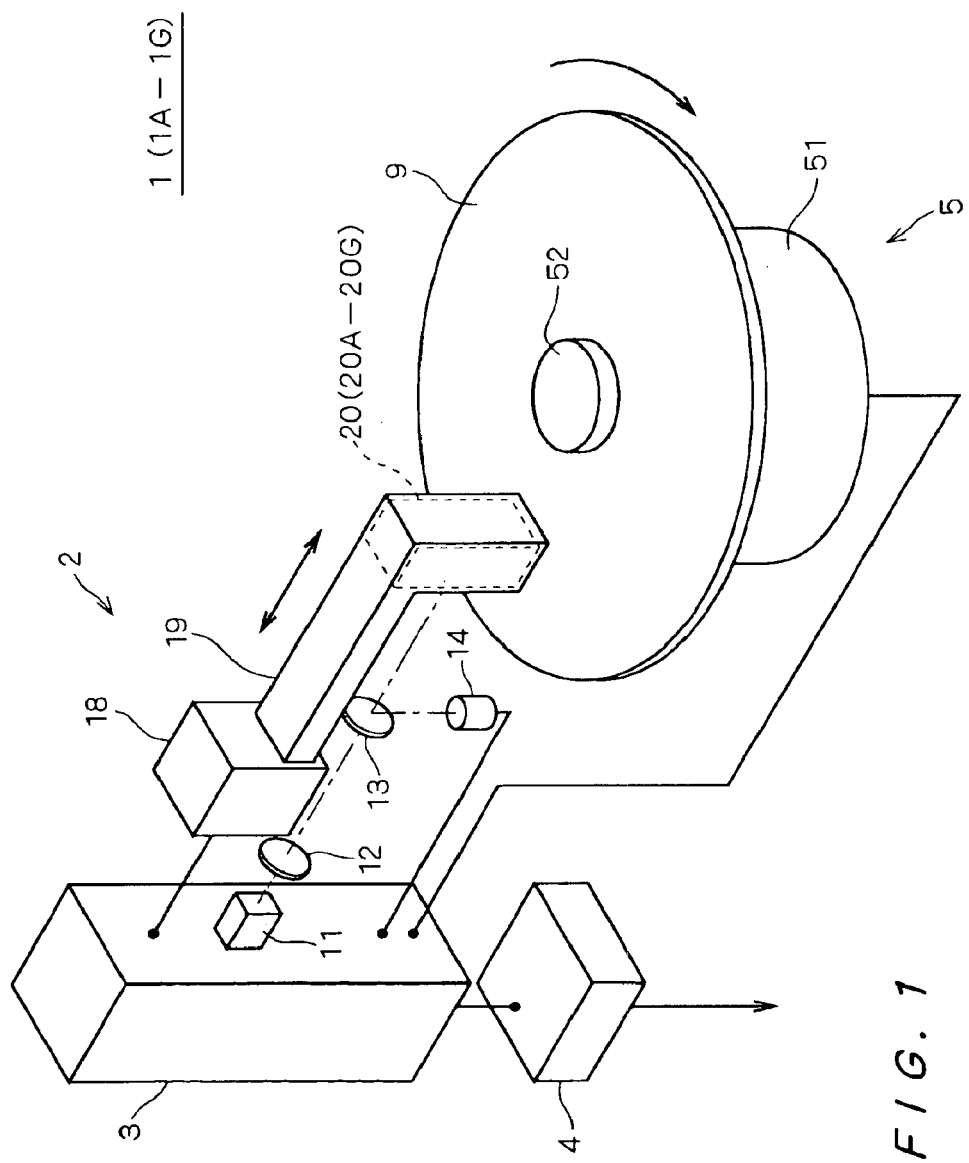
FIG. 1 is a schematic drawing that shows the structure of a recording and reproducing apparatus 1A in accordance with preferred embodiment of the present invention.
Figure 2:
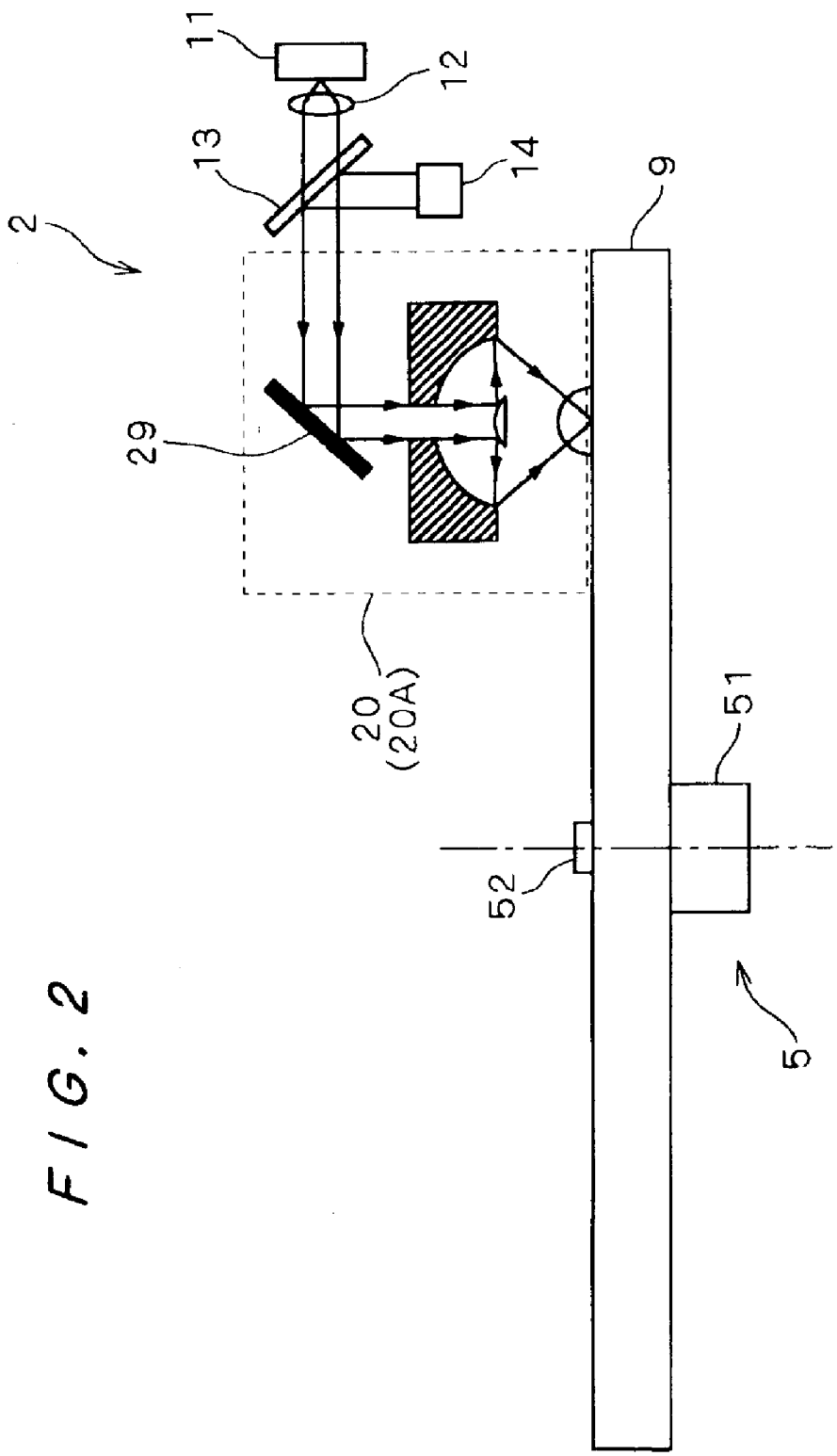
FIG. 2 is a schematic drawing that shows the structure of the recording and reproducing apparatus 1A.

FIGS. 1 and 2 are schematic drawings that show the structure of a recording and reproducing apparatus 1 (1A) in accordance with a first preferred embodiment of the present invention. The recording and reproducing apparatus 1 is constituted by a rotation mechanism section 5 for rotating a recording medium 9 in a predetermined direction with the recording medium 9 such as an optical disk being held, an optical head 2 for recording, reading (reproducing) and erasing signals on and from a recording surface of the recording medium 9; a controller 3 for giving driving control signals to the optical head 2 and the rotation mechanism section 5, and a signal processing section 4 for processing recording signals (including erasing signals) to the recording medium 9 or reproduced signals from the recording medium 9.

The rotation mechanism section 5 is provided with a rotation driving section 51 and a rotation member 52, and based upon a driving control signal given from the controller 3, the rotation driving section 51 rotates the rotation member 52 in a predetermined direction. The rotation member 52 has a structure which maintains the recording medium 9 that is removably attached thereto in a predetermined position, and carries out a rotation operation integrally with the recording medium 9 attached thereto.

The optical head 2 is provided with a laser light source 11, a collimator lens 12, a beam splitter 13, a photodetector 14, an optical head driving section 18, a holding member 19 and an optical system 20. The laser light source 11 is preferably constructed by a small-size light source such as a semiconductor laser. Here, the laser light source 11 is driven by a laser driving circuit, not shown, that is installed in the controller 3. Thus, a light beam, emitted from the laser light source 11, is directed to the recording medium 9 through the collimator lens 12, the beam splitter 13 and the optical system 20.

The collimator lens 12 as a function for shaping light emitted from the laser light source 11 into parallel light rays, and the beam splitter 13 transmits the parallel light rays directed from the collimator lens 12. The light rays that has passed through the beam splitter 13 are directed onto a recording surface of the recording medium 9 by the optical system 20 so as to form a fine spot thereon.

Here, light reflected from the recording medium 9 proceeds in a direction reversed to the above-mentioned direction, and is returned to a beam splitter 13 through the optical system 20. Then, it is reflected by the beam splitter 13, and made incident on the photodetector 14. In other words, information recorded in the recording medium 9 is read by the photodetector 14.

The laser light source 11, the collimator lens 12, the beam splitter 13 and the photodetector 14 are respectively fixed onto predetermined positions, and the optical system 20 is placed on the tip of the holding member 19. The holding member 19 is controlled by the optical head driving section 18 so as to freely advance and retreat linearly in directions to and from the rotation center of the recording medium 9; thus, the controller 3 gives a driving control signal to the optical head driving section 18 so that the position of the holding member 19, that is, the position of the optical system 20 relative to the recording medium 9, is controlled. Here, the driving mechanism of the optical head 2 is not necessarily arranged so as to allow the recording medium 9 to linearly advance and retreat in the directions to and from the rotation center of the recording medium 9, and may have a mechanism in which a holding member having a predetermined length is driven in a manner so as to rock with respect to the directions to and from the rotation center.

The signal processing section 4 has such functions that it gives data to be recorded in the recording medium 9 to the laser driving circuit through the controller 3, receives read data (reproduced data) detected by the photodetector 14 through the controller 3, and outputs the data to another data processing device.

<Recording Operation and Erasing Operation by Using a Plurality of Wavelengths>

In the above-mentioned recording and reproducing apparatus 1, light rays having a plurality of wavelengths are used. Here, an explanation will be given of a case in which light rays having three wavelengths are used in the respective recording, reproducing and erasing operations. The above-mentioned laser light-source 11 is arranged to output light rays having these three wavelengths. For example, three monochromatic laser elements are installed, and desired laser elements are selected so that the three wavelengths are selectively used so as to be made incident on the optical system 20. Alternatively, light containing a plurality of wavelengths (such as white light) is emitted from the light source, and this is allowed to pass through color filters that can be selectively switched so that only specific wavelengths are selectively made incident on the optical system 20. In this manner, light rays having a plurality of wavelengths are selectively made incident on the optical system 20.

The above-mentioned recording medium 9 has a recording layer made from a photochromic material on its surface. In this recording layer, the changes in optical characteristics, which take place in the photochromic material before and after the irradiation with light having a specific wavelength, are utilized so as to carry out recording and reproducing operations, etc. on digital information.

Figure 3:
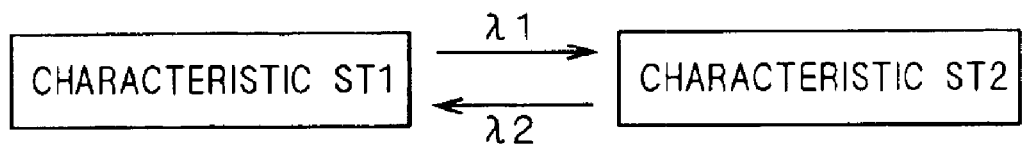
FIG. 3 is an explanatory drawing that shows changes in the state of a photochromic material.
Figure 4:
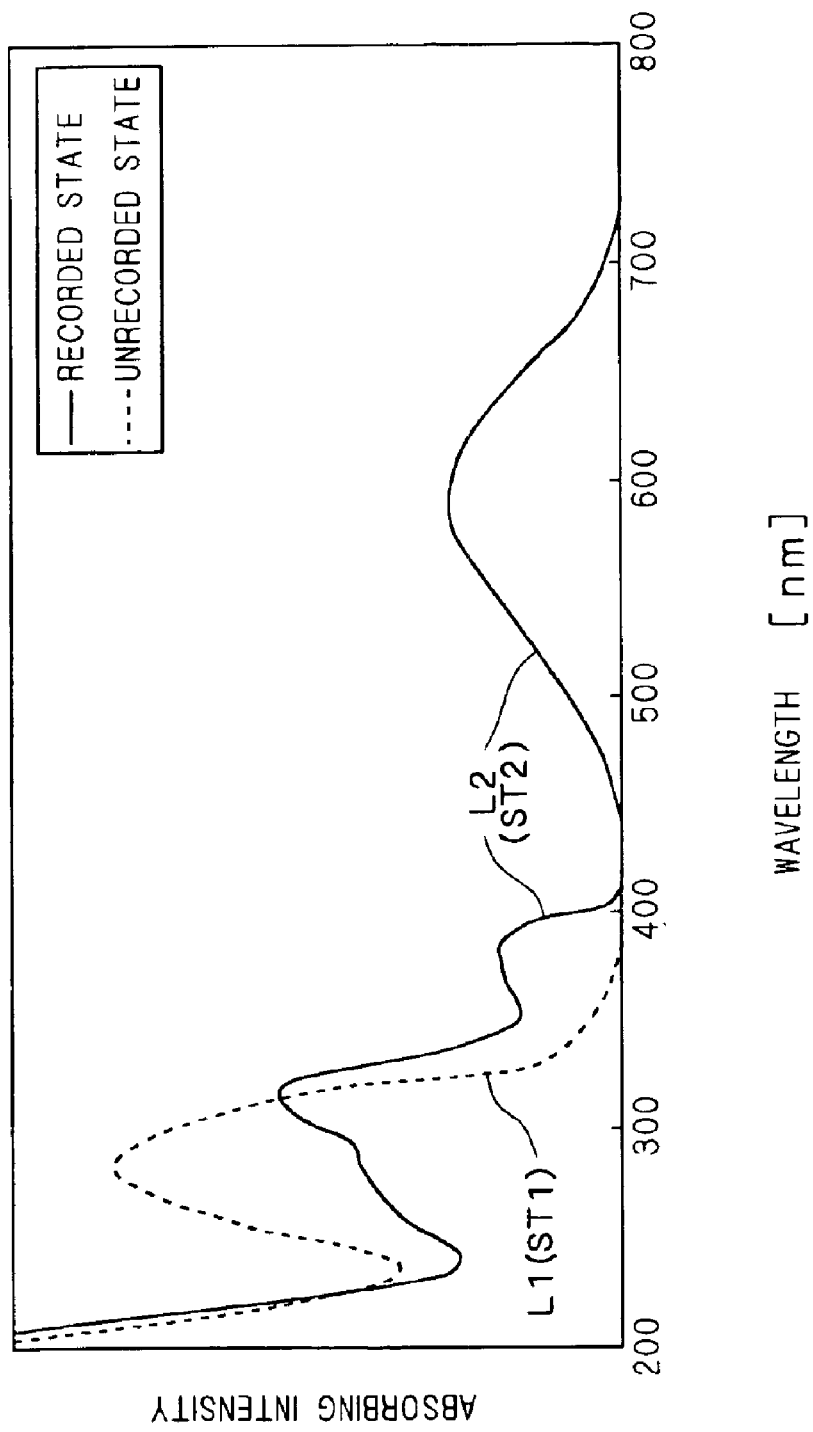
FIG. 4 is a drawing that shows the absorbing intensity with respect to each of wavelengths in each of the states having characteristics ST1 and ST2 of the photochromic material.

FIG. 3 is a drawing that explains changes in the state of a photochromic material, and FIG. 4 is a graph that shows optical characteristics indicating the absorbing intensity with respect to each of the wavelengths.

As illustrated in FIGS. 3 and 4, the photochromic material features that its optical characteristics change before and after light irradiation with a specific wavelength. For example, a photochromic material, which has a characteristic ST1 represented by a curve L1 (broken line in FIG. 4) prior to irradiation with light with a specific wavelength $\lambda 1$, is prepared, and when this is irradiated with light having the specific wavelength $\lambda 1$, the photochromic material is allowed to shift to the state having a characteristic ST2 indicated by a curve L2 (solid line in FIG. 4). When irradiated with light having a wavelength $\lambda 2$ different from the wavelength $\lambda 1$, the photochromic material is then allowed to shift from the state of the characteristic ST2 to the state of the characteristic ST1 in a reversed direction.

Therefore, for example, after the photochromic material over the entire surface of the recording layer of the recording medium 9 has been initialized to the state of the characteristic ST1 (curve L1) by using the light having the wavelength $\lambda 2$ as an erasing light, the light having the other wavelength $\lambda 1$ is directed as a recording light to only a specific portion of the recording layer of the recording medium 9 so that only the irradiated portion is allowed to shift to the state of the characteristic ST2 (curve L2). In this manner, the portion having the characteristic ST1 and the portion having the characteristic ST2 are selectively formed on the recording layer in the recording medium 9 so that the two states in the digital storage system, that is, "1" and "0", are provided. Moreover, light having still another wavelength $\lambda 3$ (for example, in the vicinity of 600 nm) is directed thereto so as to detect a difference in the reflection factor derived from the difference in the absorbing intensities of the two states, or light having a wavelength $\lambda 3$ that is not absorbed (for example, in the vicinity of 750 nm) is directed thereto so as to detect a difference in the reflection factor derived from the difference in the refractive indexes of the two states; thus, it is possible to read the two states in a distinct manner. Consequently, it becomes possible to carry out a reproducing operation on digital information composed by combining two-bit signals of "1" and "0".

The above explanation have been given of a case in which light beams having the respectively different wavelengths $\lambda 1$, $\lambda 2$ and $\lambda 3$ are used in the recording, erasing and reproducing operations; however, the present invention is not intended to be limited thereby, and for example, light beams having the same wavelength ($\lambda 1 = \lambda 3$) are used in the recording operation and the reproducing operation, and a light beam having the wavelength $\lambda 2$ may be used in the erasing operation. In this case, the respective recording, reproducing and erasing operations are carried out by using light beams having the two kinds of wavelengths.

In this manner, in the recording and reproducing apparatus 1, the respective recording, reproducing and erasing operations are carried out by using light beams having a plurality of wavelengths.

<Optical System 20 and Reflection Converging Optical System RS>

Figure 5:
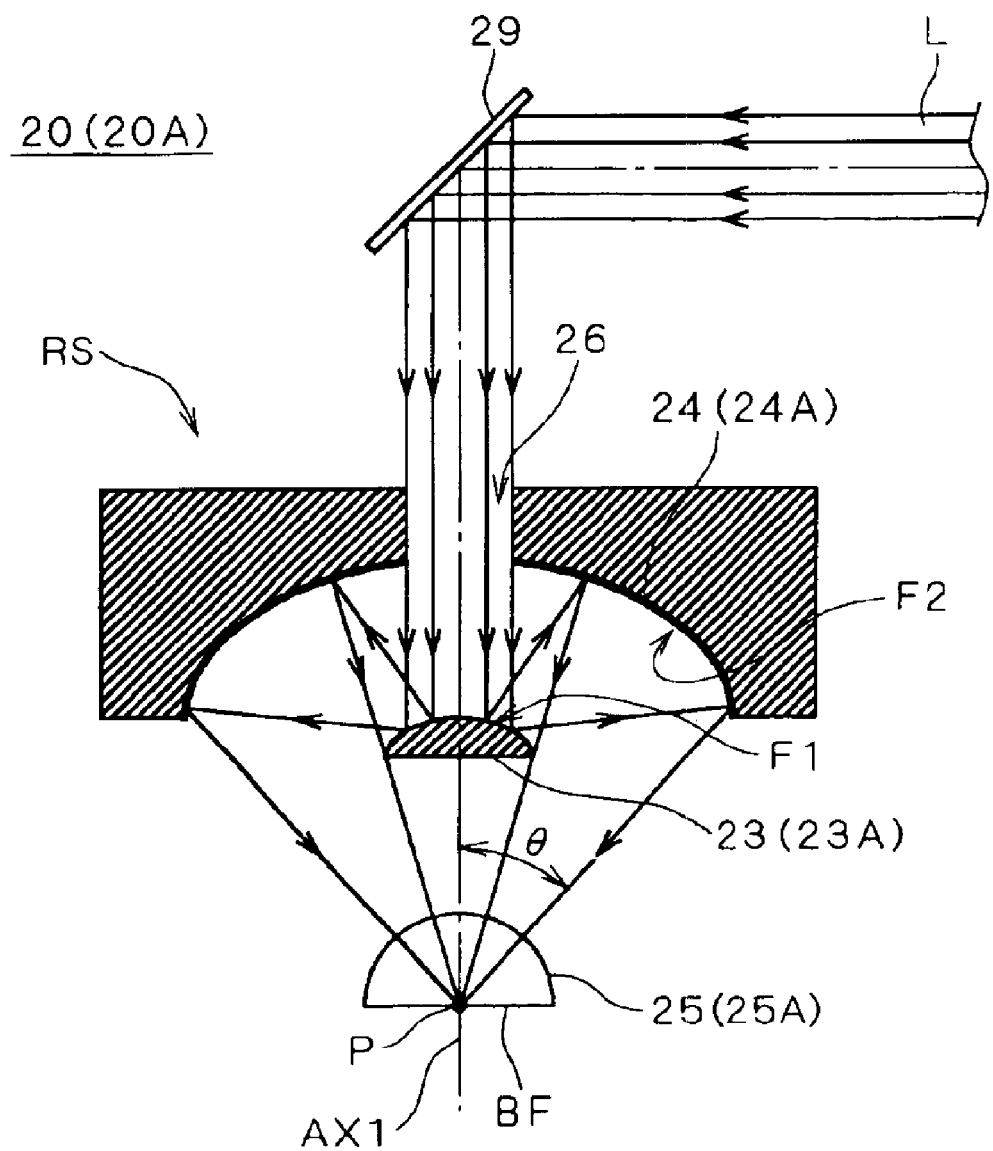
FIG. 5 is a cross-sectional view that shows the outline of an optical system 20A in accordance with a first preferred embodiment.

Next, an explanation will be given of the optical system 20 (20A). FIG. 5 is a cross-sectional view that schematically shows the optical system 20A in accordance with the first preferred embodiment. The optical system 20A is provided with a reflection members 23A, 24A, a solid immersion lens (SIL) 25A having a refractive index higher than that of air and a mirror 29. Among these, the reflection members 23A, 24A and the solid immersion lens 25A are all placed symmetrically with each other with respect to an axis (light-converging axis) AX1.

Moreover, in this optical system 20, an optical system constituted by the constituent elements (containing the solid immersion lens 25) other than the mirror 29 is referred to as a reflection converging optical system RS, and this is distinct from the optical system 20. Therefore, the mirror 29 serves as a member (light-path changing member) for changing the light proceeding path (light path) so as to allow light emitted from the laser light source 11 and taken in the optical system 20 to be made incident on the reflection converging optical system RS.

As will be described later, the reflection converging optical system RS reflects light emitted from the laser light source 11, and converges it on a boundary portion of the solid immersion lens 25.

The reflection member 23A is a member formed by coating its convex surface with a material having a high reflection factor, and the convex surface is used as "a first reflective surface" F1 in accordance with the present invention.

Moreover, the reflection member 24A is a member in which its concave surface formed at a lower portion inside thereof is coated with a material having a high reflection factor, and the concave surface is used as "a second reflection surface" F2 in accordance with the present invention. Here, the reflection member 24A has a column-shaped cutout section 26 in the center portion thereof so that light, reflected by the mirror 29 to proceed downward, is allowed to reach the reflection member 23A. Additionally, although the cutout section 26 is formed so as to transmit light in this case, a light-transmitting material may be placed at the corresponding portion so as not to form a reflective surface, thereby allowing the light to pass through it.

With respect to the reflection member 23A and reflection member 24A, for example, taking it consideration the principle of the Cassegrainian mirror used in a reflecting telescope, the concave surface of the reflection member 24A is allowed to serve as a rotation parabolic surface (hereinafter, referred to simply as a parabolic surface), and the convex surface of the reflection member 23A is allowed to serve as a rotation elliptical surface (hereinafter, referred to simply as, elliptical surface); thus, this arrangement makes it possible to reflect and converge parallel incident light rays so as to be focused at a predetermined position P (the central position in the bottom surface) of the solid immersion lens 25A. Consequently, in an arrangement for converging the parallel light rays L onto one point, the length of the optical system 20 can be shortened.

In the optical system 20A of this type, light, emitted from the laser light source 11 (see FIG. 2), is reflected by the mirror 29 of the optical system 20A to change its course downward and proceed to the reflection member 23A by which it is reflected. The light reflected by the reflection member 23A is diverged to proceed to the reflection member 24A, and is reflected by the concave reflection member 24A. Since the reflection member 24A has a concave curved surface, the light reflected by the reflection member 24A is then directed to the solid immersion lens 25A while being converged. After having been made incident on the solid immersion lens 25A, the converged light rays are allowed to form an image at point P on a bottom section BF of the solid immersion lens 25A. At this time, each light ray of the converged light rays is made incident on the solid immersion lens 25A perpendicularly thereto, without causing the refraction phenomenon; therefore, this arrangement is free from the chromatic aberration, etc.

Then, the light rays, converged on the bottom surface of the solid immersion lens 25A, are allowed to leak as near field light, and projected onto the recording surface of a recording medium 9 that is located in a near field area, in a manner so as to form a minute spot.

As described above, near field light is generated through the solid immersion lens 25A in the recording and reproducing apparatus 1A of the present invention, in a state proximate to the recording medium 9 that is an object for the optical operation. The recording and reproducing apparatus 1A is designed to carry out recording, reproducing and erasing operations of digital information on and from the recording medium 9 by utilizing the proximate field light.

Figure 6:
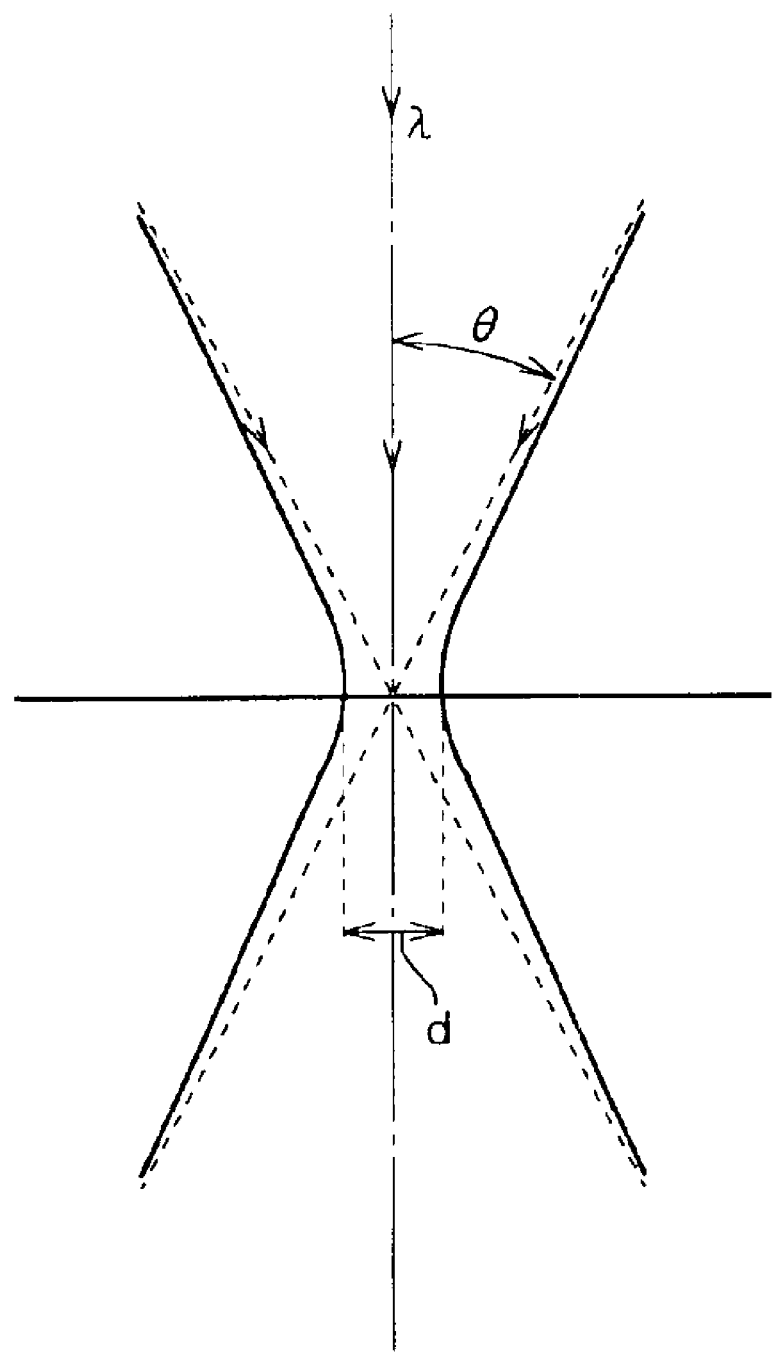
FIG. 6 is an explanatory drawing that shows a spot diameter d.

Here, the solid immersion lens 25A is made from a light-transmitting material with a high refractive index. More specifically, a glass material such as SF6 is used as the solid immersion lens 25A. The application of the solid immersion lens 25A having a high refractive index makes it possible to miniaturize the spot diameter d (see FIG. 6) converged on the bottom surface. This mechanism is understood from the fact that the diameter of the light spot diameter d is represented by the following equations (1) and (2).

$$d = \frac{k \cdot \lambda}{NA} \quad (1)$$

$$NA = n \cdot \sin\theta \quad (2)$$

Here, k represents a constant, λ represents a wavelength, and NA represents a numerical aperture. Further, θ represents an angle shown in FIG. 6 (hereinafter, also referred to as "expected converging angle"), and n represents a refractive index of a medium (here, the solid immersion lens 25A) through which light is converged.

The above-mentioned equation (2) shows that when the refractive index n of the solid immersion lens 25A has a great value (for example, a relatively great value with respect to the refractive index 1 of vacuum), the numerical aperture NA also has a great value. Moreover, the above-mentioned equation (1) shows that the greater the numerical aperture NA, the finer the spot diameter d to be obtained. In other words, by converging light within the solid immersion lens 25A having a high refractive index, it is possible to realize a finer spot diameter d.

Further, in accordance with the optical head 2 and the recording and reproducing apparatus 1 using the same, the optical system 20A, which is a reflection converging optical system for reflecting and converging light from the laser light source 11, is used for converging light onto the bottom surface BF of the solid immersion lens 25A (in general, at a boundary portion between the solid immersion lens and the peripheral area; hereinafter, also referred to simply as "boundary portion of the solid immersion lens"); therefore, different from a case in which light converging is carried out through the refraction, and which causes chromic aberration, it becomes possible to eliminate the chromic aberration.

Moreover, since the incident light onto the optical system 20A is reflected from the first reflection surface F1 and from the second reflection surface F2 twice, and then converged onto the boundary portion of the solid immersion lens, the angle θ in the Figure (expected converging angle) becomes greater, thereby making the numerical aperture NA greater, as compared with a case in which the light is reflected only once and then converged; thus, it becomes possible to obtain light rays that provide a finer spot diameter d.

<B. Second Preferred Embodiment>

Figure 7:
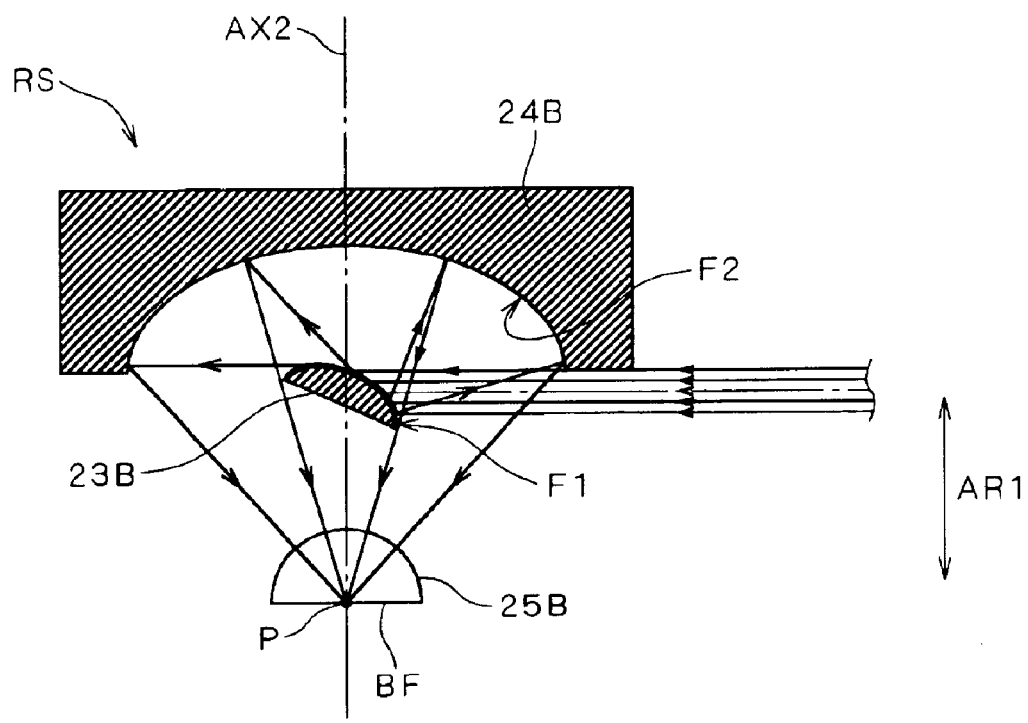
FIG. 7 is a drawing that shows an optical system 20B of a recording and reproducing apparatus 1B in accordance with a second preferred embodiment.

FIG. 7 is a drawing that shows an optical system 20B of a recording and reproducing apparatus 1B in accordance with the second preferred embodiment. Since the second preferred embodiment is a modified embodiment of the first preferred embodiment, the respective constituent elements in the recording and reproducing apparatus 1B are the same as those of the recording and reproducing apparatus 1A of the first preferred embodiment, except for the optical system 20B. Here, the same is true for the third through seventh preferred embodiments, which will be described below, and except for optical systems 20 (20C to 20G), the respective constituent elements are the same as those of recording and reproducing apparatus 1A of the first preferred embodiment.

The optical system 20B in accordance with the second preferred embodiment is provided with a reflection converging optical system RS including a reflection member 23B, 24B and a solid immersion lens 25B.

The reflection member 23B is a member formed by coating its convex surface with a material having a high reflection factor, and the convex surface is used as a first reflective surface F1. Moreover, the reflection member 24B is a member in which its concave surface formed at a lower portion inside thereof is coated with a material having a high reflection factor, and the concave surface is used as a second reflection surface F2. Here, different from the first preferred embodiment, the reflection member 23B is not placed with its bottom surface perpendicular to the axis (light converging axis) AX2, but placed with its bottom surface inclined with a predetermined angle to the perpendicular direction of the axis AX2.

Moreover, it is noted that the optical system 20B is not provided with the mirror 29. Therefore, light, emitted from the laser light source 11 (see FIG. 2) is allowed to proceed in the horizontal direction, as it is, without being changed in its course by the mirror 29, which is different from the first preferred embodiment. Then, the light is allowed to further proceed from the side with respect to the axis (light converging axis) AX2 of the reflection light converging system RS toward the reflection member 23B (the first reflection surface F1). The light, reached the reflection member 23B, is reflected and diverged by the reflection member 23B, and then allowed to proceed to the second reflection member 24B (the second reflection surface F2). Then, after having been reflected and converged by the reflection member 24B, it is converged onto point P of the bottom surface BF of the solid immersion lens 25B.

With this arrangement, the light emitted from the laser light source 11 and taken in the optical system 20B is made incident on the first reflection surface F1 from the side with respect to the optical system 20; therefore, since the size of the optical system 20 in the height direction (the direction indicated by arrow AR1) can be reduced, it is possible to make the optical head smaller and thinner, in addition to the same effects as the first preferred embodiment.

<C. Third Preferred Embodiment>

Figure 8:
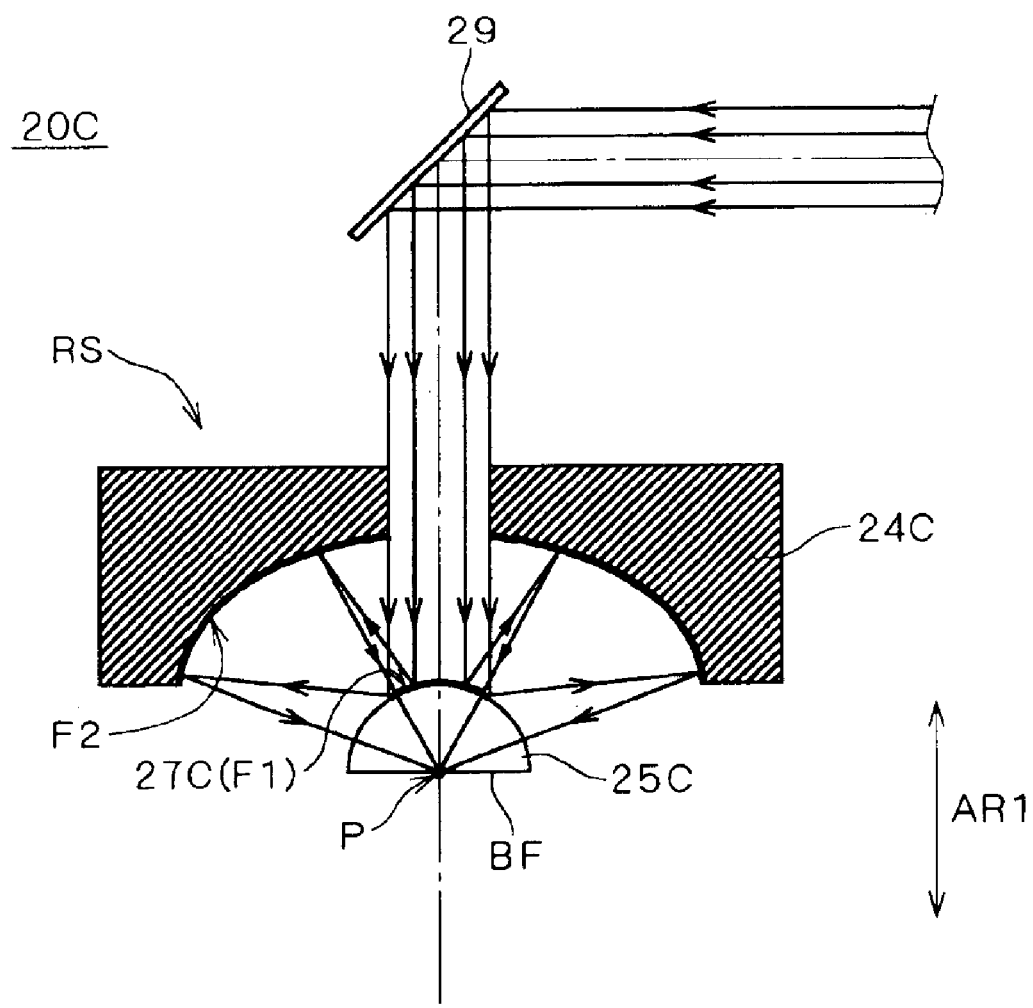
FIG. 8 is a drawing that shows an optical system 20C of a recording and reproducing apparatus 1C in accordance with a third preferred embodiment.

FIG. 8 is a drawing that shows an optical system 20C of a recording and reproducing apparatus 1C in accordance with the third preferred embodiment. As illustrated in FIG. 8, the optical system 20C is provided with a reflection converging optical system RS including a reflection member 24C and a solid immersion lens 25C, and a mirror 29 for changing the light path so as to allow light emitted from the laser light source 11 to be made incident on the reflection converging optical system RS.

The reflection member 24C has the same structure as the reflection member 24A of the first preferred embodiment, and its concave surface is used as the second reflection surface F2.

Moreover, in the present preferred embodiment, the reflection member 23 (see FIG. 5, etc.) functioning as the first reflection surface F1 is not placed, and instead of this, one portion of the solid immersion lens 25C is allowed to function as the first reflection surface. More specifically, the solid immersion lens 25C has a semi-spherical shape, and on the center of the upper surface of the semi-spherical surface (more generally, one area of a curved surface having any one of various shapes such as a parabolic shape, an elliptical shape and an axis-symmetrical aspherical shape), metal, such as silver, aluminum, and chromium, is deposited by a method such as sputtering and vapor deposition so that a reflection section having a high reflection factor is formed, and this reflection section 27C is used as "the first reflection surface" F1. Moreover, the solid immersion lens 25C has a light-transmitting property except for the reflection section 27C of the semi-spherical surface; thus, light, which has proceeded thereto, is allowed to pass, and converged onto a predetermined position.

In this optical system 20C, light, emitted from the laser light source 11 (see FIG. 2), is reflected by the mirror 29 of the optical system 20C, and has its course changed downward to proceed to the first reflection surface F1 placed as the reflection section 27C on the solid immersion lens 25C, and after having been reflected by the reflection surface F1, it is allowed to proceed to the second reflection surface F2 of the reflection member 24C. After having been reflected by the reflection surface F2, the light is converged onto point P of the bottom surface BF of the solid immersion lens 25C.

With this arrangement, since it is not necessary to install the reflection member 23, the size of the optical system 20 in the height direction (in the direction indicated by arrow AR1) can be reduced; thus, it becomes possible to make the optical head smaller and thinner, in addition to the same effects as the first preferred embodiment.

<D. Fourth Preferred Embodiment>

Figure 9:
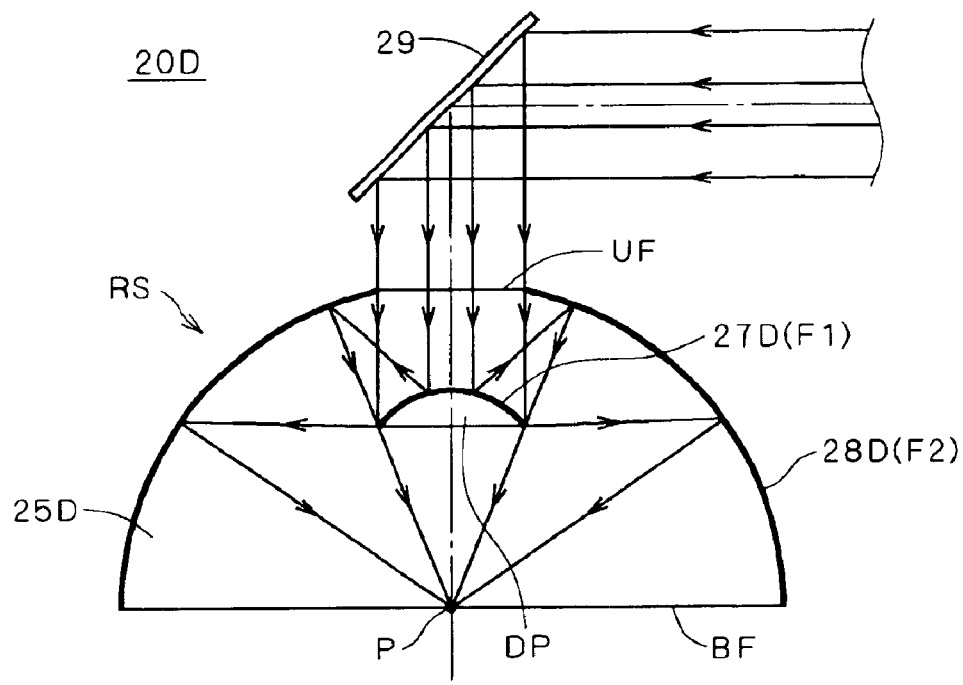
FIG. 9 is a drawing that shows an optical system 20D of a recording and reproducing apparatus 1D in accordance with a fourth preferred embodiment.

FIG. 9 is a drawing that shows an optical system 20D of a recording and reproducing apparatus 1D in accordance with the fourth preferred embodiment. As illustrated in FIG. 9, the optical system 20D is provided with a reflection converging optical system RS having a solid immersion lens 25D having a refractive index higher than that of air, and a mirror 29 for changing the light path so as to allow light emitted from the laser light source 11 to be made incident on the reflection converging optical system RS.

This solid immersion lens 25D is made of a light-transmitting material having a refractive index higher than that of air, and its outer shape is determined by an outer curved surface having any one of various shapes, such as a parabolic surface, an elliptical shape and an aspherical shape, and a bottom surface BF formed by a flat surface. On an area except for the upper center portion (that is, a ring-shaped peripheral area) of the outer curved surface, a reflection section 28D formed by a material having a high reflection factor is placed. This reflection section 28D is used as the second reflection surface F2. Moreover, the solid immersion lens 25D has an inside curved surface (an inner curved surface) in its inner center section, and this inside curved surface is provided with a reflection section 27D along the curved surface. The reflection section 27D is used as the above-mentioned first reflection surface F1, and exerts the same functions as the above-mentioned reflection member 23, etc. Moreover, in its upper center portion, the solid immersion lens 25D is provided with an upper incident section UF for transmitting light L that is made incident on the solid immersion lens 25D through the mirror 29 from above. This upper incident section UF is formed with vertical surfaces (flat surfaces) with respect to the proceeding direction of the light L so as not to cause light refraction phenomenon upon receipt of incident light on the solid immersion lens 25E. Here, no reflection member is placed in the bottom surface BF of the solid immersion lens 25D; thus, converged light is allowed to pass so as not to prevent the generation of proximity field light.

Figure 10:
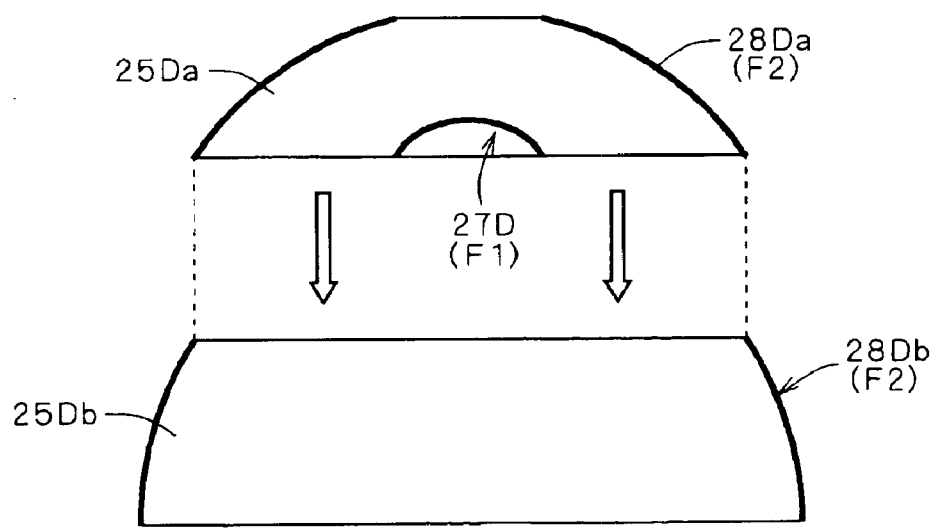
FIG. 10 is a drawing that shows a manufacturing method of a solid immersion lens 25D.

The solid immersion lens 25D of this type may be manufactured as follows: As illustrated in FIG. 10, first, an upper member 25Da and a lower member 25Db are formed. These two members 25Da, 25Db have shapes in a manner so as to divide the final shape of the solid immersion lens 25D into upper and lower two portions, and the respective portions are formed by using a glass molding method, etc.

Next, a lower center portion of the upper member 25Da is cut out to form a concave surface, and a mirror surface (the above-mentioned reflection section 27D) by allowing metal such as silver, aluminum and chromium to deposit on the concave surface by a method such as sputtering or vapor deposition. Moreover, in the same method, the same metal is also deposited on the portion of the upper member 25Da corresponding to the outside curved surface, except for the upper center portion thereof, as well as on the portion of the lower member 25Db corresponding to the outside curved surface; thus, respective mirror surfaces (reflection surfaces) 28Da and 28Db are formed.

Then, the upper member 25Da and the lower member 25Db are bonded to each other with a bonding agent. With respect to the bonding agent, those agents which form the same refractive index as the material of the solid immersion lens 25D are selected in accordance with the material of the solid immersion lens 25D. Alternatively, instead of bonding with a bonding agent, after refractive index matching oil (having the same refractive index as the solid immersion lens 25D) used for closely contacting the two members have been interpolated in between, the upper member 25Da and the lower member 25Db may be fixed to each other from outside. Here, after the reflection section 28D (28Da, 28Db) has been formed, the upper member 25Da and the lower member 25Db are bonded, etc.; however, the reflection section 28D may be formed after the upper member 25Da and the lower member 25Db have been bonded.

Alternatively, the solid immersion lens 25D may be formed by the following method. As illustrated in FIG. 11, a column-shaped member 25Dc containing surfaces corresponding to the reflection section 27D and the other member 25Dd are manufactured in a separate manner. Then, after a concave surface has been formed in the bottom of the column-shaped member 25Dc, metal, such as aluminum and chromium, is deposited on the concave surface by a method such as sputtering or vapor deposition so as to form coating thereon; thus, a reflection section is formed as the reflection section 27D (the first reflection surface F1). Moreover, a reflection section is also formed on the outer curved surface of the member 25Dd as the reflection section 28D (the second reflection surface F2). Thereafter, the same processes as described above are carried out so that the two members 25Dc and 25Dd are bonded or made to closely contact each other; thus, the solid immersion lens 25D is formed.

Moreover, in the above-mentioned method, the lower portion DP (see FIG. 9) of the reflection surface (mirror surface) 27D is formed as a hollow section; however, not limited to this structure, another medium, such as BK7 or polycarbonate, may be embedded therein.

As illustrated in FIG. 9, in the optical system 20 including the solid immersion lens 25D manufactured as described above, light, emitted from the laser light source 11 (see FIG. 2), is reflected by the mirror 29 of the optical system 20 to change its course downward to proceed to the first reflection surface F1 placed as the reflection section 27D in the solid immersion lens 25D. After having been reflected from the reflection section 27D (the first reflection surface F1), it further proceeds to the reflection section 28D (the second reflection surface F2). The light, reached the second reflection surface, is reflected by the reflection surface F2, and then converged on point P in the center of the bottom surface BF of the solid immersion lens 25D.

With this arrangement, it is not necessary to install constituent elements, such as reflection members 23, 24, as separate parts other than the solid immersion lens 25D; therefore, since the size of the optical system 20D can be reduced, it becomes possible to make the optical head smaller and thinner, in addition to the same effects as the first preferred embodiment.

<E. Fifth Preferred Embodiment>

Figure 12:
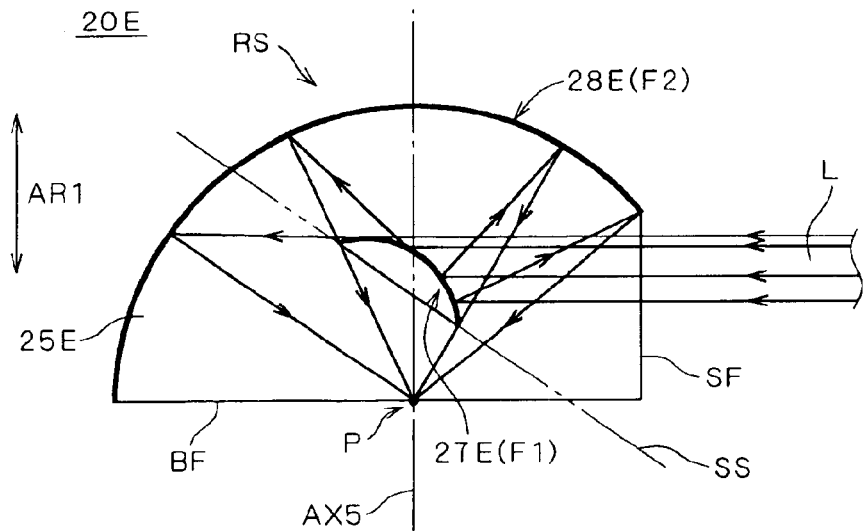
FIG. 12 is a drawing that shows an optical system 20E of a recording and reproducing apparatus 1E in accordance with a fifth preferred embodiment.

FIG. 12 is a drawing that shows an optical system 20E of a recording and reproducing apparatus 1E in accordance with the fifth preferred embodiment. Although the optical system 20E is provided with a reflection converging optical system RS having a solid immersion lens 25E, no mirror 29 is installed. Therefore, the present preferred embodiment is different from the fourth preferred embodiment in that light which is made incident on the solid immersion lens sideways is reflected and converged instead of the arrangement in which light made incident on the solid immersion lens from above is reflected and converged.

This solid immersion lens 25E is provided with a side incident section SF formed by cutting out one portion of its outer curved surface. The side incident section SF transmits light L that is directly made incident on the solid immersion lens 25 sideways without passing through the mirror 29. The side incident section SF is formed with perpendicular surfaces (flat surfaces) with respect to the proceeding direction of the light L so as not to cause light refraction phenomenon upon receipt of incident light on the solid immersion lens 25E. Moreover, the solid immersion lens 25D is provided with a reflection section 28E formed by a material having a high reflection factor on its outer curved surface except for the side incident section SF. This reflection section 28E is used as the aforementioned second reflection surface F2. Moreover, the solid immersion lens 25E has an inside curved surface (an inner curved surface) in its inner center section, and this inside curved surface is provided with a reflection section 27E along the curved surface. The reflection section 27E serves as the above-mentioned first reflection surface F1. Here, the reflection section 27E is placed with its center axis of symmetry of the curved surface being inclined with a predetermined angle with respect to the axis (light converging axis) AX5.

Additionally, the solid immersion lens 25E of this type can be manufactured by the same method as the fourth preferred embodiment. However, in the fourth preferred embodiment, the explanation has been given of a case in which, when manufactured, the lens is divided into two parts, that is, the upper member and the lower member, by a plane in parallel with the bottom surface BF; however, in this case, when manufactured, the lens is divided into two parts, that is, the upper member and the lower member, by an inclined plane SS (see FIG. 12) having a predetermined inclination with respect to the bottom surface BF. Alternatively, as indicated by reference to FIG. 1, it may be divided into a column-shape member and the other members, when manufactured.

In this optical system 20E, light L, emitted from the laser light source 11 (see FIG. 2), is allowed to proceed horizontally, as it is, and is made incident on the solid immersion lens 25E through the side incident section SF of the solid immersion lens 25E. Then, the light, made incident through the side incident section SF, is allowed to proceed to the reflection section 27E, and reflected by the reflection section 27E. Here, the reflection section 27E is placed so as to have a predetermined inclination with respect to the horizontal state; thus, it is allowed to exert two functions, that is, a function for changing the proceeding direction of light and a function for diverging (diffusing) the reflection direction of light. The light, reflected by the reflection section 27E, is allowed to proceed to the reflection section 28E, and after having been reflected by the reflection section 28E, it is converged onto point P of the bottom surface BF of the solid immersion lens 25E.

With this arrangement, the light L, emitted from the laser light source 11, is made incident on the first reflection surface F1 through the side section of the solid immersion lens 25E; therefore, since the size of the optical system 20E in the height direction (in the direction indicated by arrow AR1) can be reduced, it becomes possible to make the optical head smaller and thinner, in addition to the same effects as the fourth preferred embodiment, <F. Sixth Preferred Embodiment>

Figure 13:
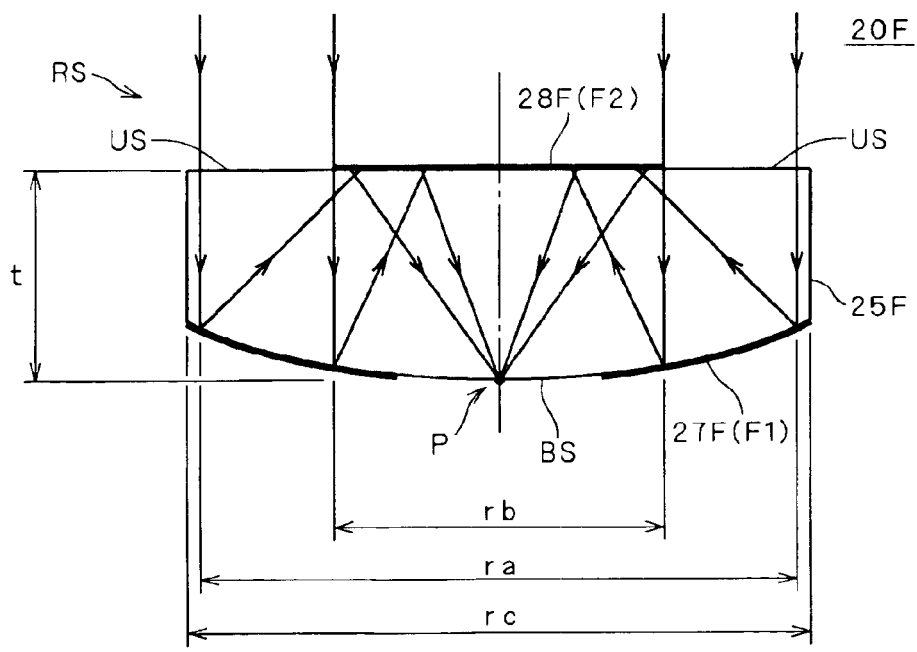
FIG. 13 is a drawing that shows an optical system 20F of a recording and reproducing apparatus 1F in accordance with a sixth preferred embodiment.

The sixth and seventh preferred embodiments will exemplify cases in which the solid immersion lens has still another shape. First, in the sixth preferred embodiment, as illustrated in FIG. 13, an explanation will be given of a case in which the solid immersion lens has a plane-convex (one surface is plane, and the other is convex) shape.

The optical system 20 (20F) of the sixth preferred embodiment has a solid immersion lens 25F which has an upper surface US that is a plane surface and a bottom surface BS that is shaped into a predetermined curved surface.

On the peripheral area (having an annular shape) of the bottom surface BS, a reflection section 27F (the first reflection surface F1) is formed by depositing metal on the peripheral area. Moreover, on the center area of the upper surface US of the solid immersion lens 25F, a reflection section 28F (the second reflection surface F2) is formed.

Here, on the peripheral area of the upper surface US, an incident section, which transmits light that is made incident on the solid immersion lens 25F, is formed without forming a reflection section. Moreover, on the center area of the bottom surface BS, no reflection section is formed so as to transmit light converged on the bottom surface BS of the solid immersion lens 25F; thus, provision is made so as not to prevent the generation of near field light.

In this optical system 20F, light L, emitted from the laser light source 11 (see FIG. 2), is reflected by the mirror 29 (not shown) of the optical system 20F to change its course downward, and is made incident on the solid immersion lens 25F. At this time, one portion of the light is blocked by the reflection section 28F, the rest of the light is made incident on the solid immersion lens 25F through the peripheral area of the upper surface US. The incident section placed on the upper surface US is formed as planes perpendicular to the proceeding direction of the parallel light L so as not to cause the light refraction phenomenon at the time when the light is made incident on the solid immersion lens 25F. Here, the annular (ring-shaped) light, made incident on the peripheral area of the upper surface US, is allowed to proceed to the reflection section 27F of the bottom surface BS, and is reflected by the reflection section 27F. The light, which has been reflected by the reflection section 27F, is allowed to further proceed to the reflection section 28F while being converged, and after having been reflected by the reflection section 28F, is converged onto point P of the bottom surface BS of the solid immersion lens 25F.

The shape of the reflection section 27F (or the bottom surface BS) is determined in such a manner that the light, made incident on the solid immersion lens 25F, is reflected and converged onto point P of the bottom surface BS of the solid immersion lens 25F by means of the reflection converging optical system including the first reflection surface F1 and the second reflection surface F2.

For example, the shape of the reflection section 27F is represented by a curved surface defined by the following equation (3) related to the axis-symmetrical aspherical surface.

$$x = \frac{C \cdot y^2}{1 + \sqrt{(1 - \varepsilon \cdot C^2 \cdot y^2)}} + \sum_i (Ai \cdot y^i) \quad (3)$$

Figure 14:
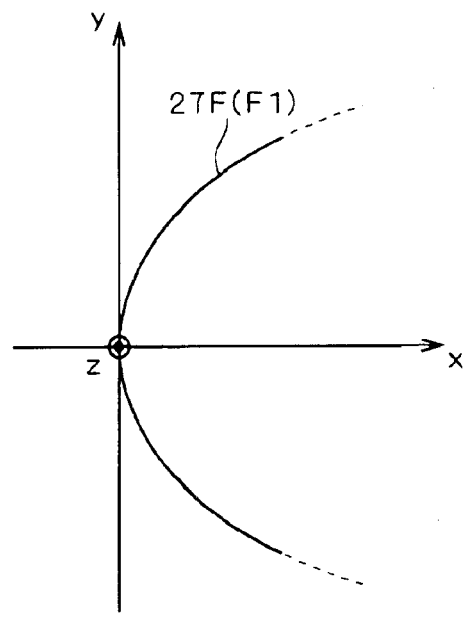
FIG. 14 is a drawing that shows variables x and y in a formula concerning an axis-symmetrical aspherical surface.

Variables in this equation (3) show respective amounts shown in FIG. 14; and y represents a position in the vertical direction to the light axis (x axis), x represents the amount of dislocation in the light-axis direction in accordance with the value of y, C represents the curvature at the top of the surface, $\varepsilon$ represents (basic) quadratic surface parameters ($\varepsilon=1$: spherical surface, $\varepsilon=0$: parabolic surface, $\varepsilon<0$: hyperbolic surface, others: elliptical surface), and Ai represents the axis-symmetrical aspherical surface coefficient of i-order.

The values of these variables are, for example, $C=1/3.614$, $\varepsilon=1.00$, $A4=-0.173$, $A6=0.455$, $A8=-0.707$, and $A10=0.199$. Moreover, other parameters (see FIG. 13) in the solid immersion lens 25F (material: SF6 (refractive index n=1.80)) are: the effective diameter (ra) of the reflection section 27F=2.0 mm, the diameter (rb) of the reflection section 28F=1.08 mm, the outside diameter (rc)=3.2 mm, and the core thickness t=0.9 mm.

With this arrangement, the same effects as the fourth preferred embodiment are obtained.

<G. Seventh Preferred Embodiment>

Figure 15:
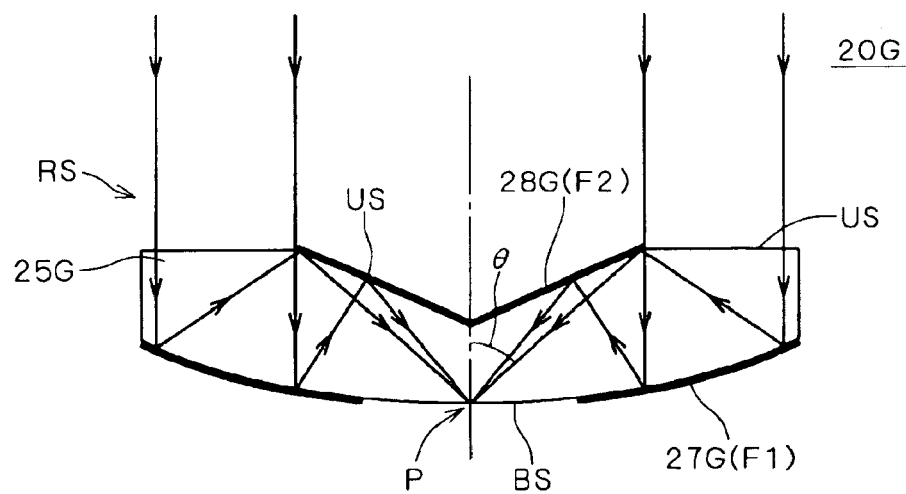
FIG. 15 is a drawing that shows an optical system 20G of a recording and reproducing apparatus 1G in accordance with a seventh preferred embodiment.

The seventh preferred embodiment is a further modified embodiment of the sixth preferred embodiment. As illustrated in FIG. 15, the optical system 20 (20G) of the seventh preferred embodiment is provided with a solid immersion lens 25G which has an upper surface US that is formed as a combination of a plane and a cone surface, and a bottom surface BS that is formed into a curved surface having a predetermined shape. This preferred embodiment is different from the sixth preferred embodiment in that the reflection surface (mirror surface) 28G in the center area of the upper surface US of the solid immersion lens 25G is formed as a cone surface (cone-shaped concave section). In this solid immersion lens 25G, the reflection section 28G functions as the second reflection surface F2. The other structures are the same as those of the sixth preferred embodiment.

In this optical system 20G, light L, emitted from the laser light source 11 (see FIG. 2), is reflected by the mirror 29 (not shown) of the optical system 20G to change its course downward, and is made incident on the solid immersion lens 25G through the peripheral area of the upper surface US. Then, the light, made incident through the peripheral area of the upper surface US, is allowed to proceed to the reflection section 27G of the bottom surface BS, and reflected by the reflection section 27G. The light thus reflected by the reflection section 27G is allowed to proceed to the reflection section 28G, and after having been reflected by the reflection section 28G, is converged onto point P in the center of the bottom surface BS of the solid immersion lens 25F.

With this arrangement, the reflection section 28G is shaped into (not a plane as in the case of the sixth preferred embodiment) a cone surface; therefore, in addition to the same effects obtained in the sixth preferred embodiment and other preferred embodiments, it is possible to further increase the expected light-converging angle $\theta$. Therefore, as is understood from equations (1) and (2), it is possible to obtain a greater numerical aperture NA by increasing the angle $\theta$ (the expected light-converging angle), and consequently to further miniaturize the spot diameter d of the converged light.

<H. Others>

In the respective preferred embodiments, the first reflection surface F1 and the second reflection surface F2 are exemplified as various curved surfaces such as a parabolic surface. In this manner, these reflection surfaces F1 and F2 are properly combined and designed so as to reflect parallel light rays L and converge them on the bottom surface (boundary portion) on the solid immersion lens 25, and with respect to the shapes of the respective reflection surfaces, any of various shapes, such as a parabolic surface, a spherical surface, an elliptical surface and an axis-symmetrical aspherical surface, may be used. Here, in order to provide a light-converging function, at least one of the two reflection surfaces F1 and F2 is formed not as a plane, but as a curved surface.

For example, in the first preferred embodiment, the shapes of the reflection member 23A and the reflection member 24A are not limited to parabolic surfaces, etc., and any of various shapes, such as a spherical shape, an elliptical surface and an axis-symmetrical aspherical surface, may be used, as long as the two reflection surfaces F1 and F2 allow the light L to be converged on the boundary portion of the solid immersion lens 25. Moreover, as long as such a condition is satisfied, the first reflection surface F1 may be not a convex surface, but a concave surface. Moreover, in the seventh preferred embodiment, in the reflection section 28G formed as a cone surface (cone shaped concave section), the concave surface may be formed with the respective generating lines of the cone surface (indicated by straight lines in the cross-sectional view of FIG. 15) being protrude upward.

Moreover, in the above-mentioned respective preferred embodiments, parallel light rays (collimate light) are used as the incident light to the optical system 20; however, non-collimate light may be used in the present invention. In this case, the shapes of the respective reflection surfaces F1 and F2, etc. are modified so as to be suitable for non-collimate light.

Figure 16:
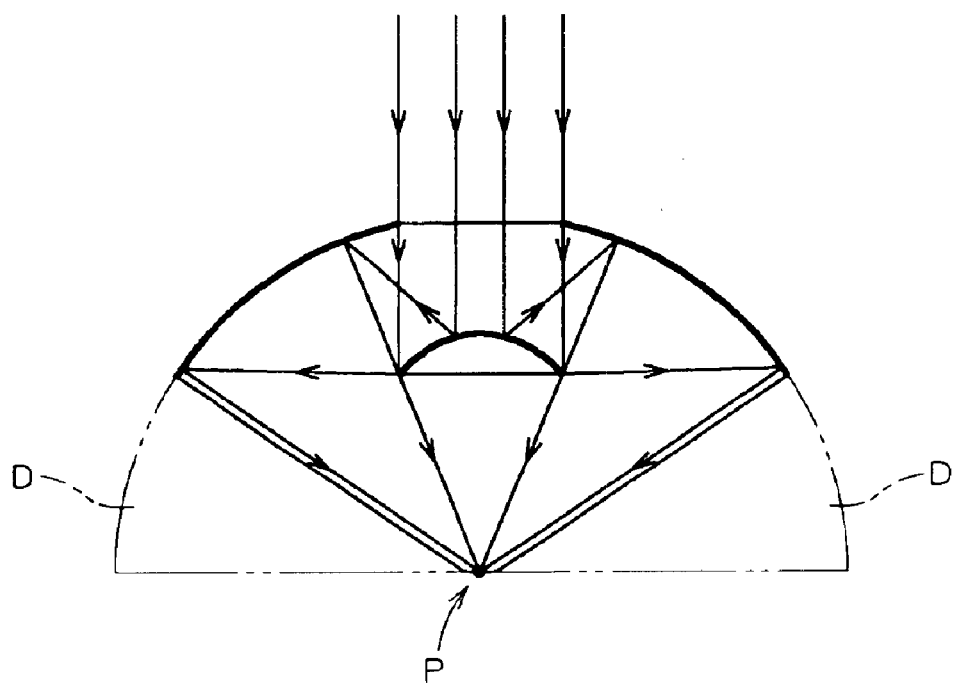
FIG. 16 is a cross-sectional view of a solid immersion lens related to a modified example.

Furthermore, in the respective preferred embodiments, the solid immersion lens 25 has an outer shape, etc. that is determined by the bottom surface and the outer curved surface; however, the present invention is not intended to be limited thereby. For example, as illustrated in FIG. 16, it may have a shape in which no portions through which no converged light is transmitted are omitted. The solid immersion lens shown in FIG. 16 has the shape being omitted portion D including most of the bottom surface (in other words, a sector-form area D) in a solid immersion lens 25D shown in FIG. 9, while maintaining the fine center area of the bottom surface containing the light-converging position (image-forming position) P of the spot light and the portions through which the converged light is transmitted.

Here, in the respective preferred embodiments, the incident light from the laser light source 11 is converged on the bottom surface of each of the solid immersion lenses 25; however, depending on the layout state, etc. of the optical head 2, the bottom surface may be placed at a position (state) other than the bottom side (lower side). Even in such a case, in the present specification, the respective parts are specified by the respective names given therein.

Moreover, in the recording and reproducing apparatus 1 of the respective preferred embodiments, the explanation has been given of a case in which all the recording, reproducing and erasing operations of digital information are carried out on the recording medium 9; however, the recording and reproducing apparatus of the present invention is not limited thereby, as long as at least one of the recording, reproducing and erasing operations is carried out.

Here, in this case, light rays having a plurality of wavelengths are used depending on the respective recording/reproducing/erasing operations, and in addition to this, these may also be used for tracking operations. For example, in a recording and reproducing apparatus which carries out only a reproducing operation, the present invention may be applied to a case in which light rays having different wavelengths are used with respect to the light used for the reproducing operation and the light used for the tracking operation.

While the invention has been shown and described in detail, the foregoing description is in all aspects illustrative and not restrictive. It is therefore understood that numerous other modifications and variations can be devised without departing from the scope of the invention.

What is claimed is:

1. An optical head comprising:

a light source for emitting light; and a reflection converging optical system which includes a solid immersion lens essentially made of a light-transmitting medium, and reflects said light emitted from said light source and taken in said solid immersion lens to converge said light onto a boundary portion of said solid immersion lens, said reflection converging optical system comprising:

a first reflection surface for reflecting said light that has been emitted from said light source and taken in said reflection converging optical system; and a second reflection surface for further reflecting said light reflected by said first reflection surface and for converging said light onto said boundary portion of said solid immersion lens;

wherein said light emitted from said light source is taken in said first reflection surface sideways with respect to a light-converging axis of said reflection converging optical system.

2. The optical head according to claim 1, wherein said first reflection surface and said second reflection surface are formed on said solid immersion lens.

3. The optical head according to claim 1, wherein said first reflection surface diverges light, and said second reflection surface converges light.

4. An optical head comprising:

a light source for emitting light; and a reflection converging optical system which includes a solid immersion lens essentially made of a light-transmitting medium, and reflects said light emitted from said light source and taken in said solid immersion lens to converge said light onto a boundary portion of said solid immersion lens, said reflection converging optical system comprising:

a first reflection surface for reflecting said light that has been emitted from said light source and taken in said reflection converging optical system; and a second reflection surface for further reflecting said light reflected by said first reflection surface and for converging said light onto said boundary portion of said solid immersion lens;

wherein said first reflection surface and said second reflection surface are formed on said solid immersion lens; and said solid immersion lens comprises: a bottom surface and an outer curved surface defining an outer shape thereof, and an inner curved surface that is placed inside said solid immersion lens, the inner curved surface having a reflection section serving as said first reflection surface, the outer curved surface having a reflection section serving as said second reflection surface and an incident section for transmitting incident light onto said solid immersion lens;

wherein said light that has been made incident on said solid immersion lens through said incident section is reflected by said first reflection surface placed on said inner curved surface, and further reflected by said second reflection surface placed on said outer curved surface, and then converged on a center area of said bottom surface.

5. An optical head comprising:

a light source for emitting light; and a reflection converging optical system which includes a solid immersion lens essentially made of a light-transmitting medium, and reflects said light emitted from said light source and taken in said solid immersion lens to converge said light onto a boundary portion of said solid immersion lens, said reflection converging optical system comprising:

a first reflection surface for reflecting said light that has been emitted from said light source and taken in said reflection converging optical system; and a second reflection surface for further reflecting said light reflected by said first reflection surface and for converging said light onto said boundary portion of said solid immersion lens;

wherein said first reflection surface and said second reflection surface are formed on said solid immersion lens; and the solid immersion lens has an upper surface and a bottom surface, the upper surface has an incident section for transmitting incident light onto said solid immersion lens and a reflection section serving as said second reflection surface, the bottom surface has a reflection section serving as said first reflection surface on a peripheral area of said bottom surface, the incident section being placed on a peripheral area on said upper surface so that said light that has been made incident on said solid immersion lens through said incident section is reflected by said first reflection surface placed on said peripheral area of said bottom surface, and further reflected by said second reflection surface placed on a center area of said upper surface, and then converged on a center area of said bottom surface.

6. The optical head according to claim 5, wherein the second reflection surface is formed on a cone-shaped concave section placed on said upper surface.

7. An apparatus for carrying out at least anyone of recording, reproducing and erasing processes of information on a recording medium, comprising:

a) an optical head, said optical head including:

a-1) a light source for emitting light; and a-2) a reflection converging optical system which includes a solid immersion lens essentially made of a light-transmitting medium, and reflects said light emitted from said light source and taken in said reflection conversion system to converge said light onto a boundary portion of said solid immersion lens, said reflection converging optical system comprising:

a-2-1) a first reflection surface for reflecting said light that has been emitted from said light source and taken in said reflection converging optical system; and a-2-2) a second reflection surface for further reflecting said light reflected by said first reflection surface and for converging said light onto said boundary portion of said solid immersion lens; and b) a signal processing section for processing a recording signal to said recording medium or a reproduced signal from said recording medium, through said optical head;

wherein said light emitted from said light source is made incident on said first reflection surface sideways with respect to a light-converging axis of said reflection converging optical system.

8. The apparatus according to claim 7, wherein said first reflection surface and said second reflection surface are formed on said solid immersion lens.

9. The apparatus according to claim 7, wherein said first reflection surface diverges light, and said second reflection surface converges light.

10. An apparatus for carrying out at least anyone of recording, reproducing and erasing processes of information on a recording medium, comprising:

a) an optical head, said optical head including:

a-1) a light source for emitting light; and a-2) a reflection converging optical system which includes a solid immersion lens essentially made of a light-transmitting medium, and reflects said light emitted from said light source and taken in said reflection conversion system to converge said light onto a boundary portion of said solid immersion lens, said reflection converging optical system comprising:

a-2-1) a first reflection surface for reflecting said light that has been emitted from said light source and taken in said reflection converging optical system; and a-2-2) a second reflection surface for further reflecting said light reflected by said first reflection surface and for converging said light onto said boundary portion of said solid immersion lens; and b) a signal processing section for processing a recording signal to said recording medium or a reproduced signal from said recording medium, through said optical head;

wherein said first reflection surface and said second reflection surface are formed on said solid immersion lens; and said solid immersion lens comprises: a bottom surface and an outer curved surface defining an outer shape thereof, and an inner curved surface that is placed inside said solid immersion lens, the inner curved surface having a reflection section serving as said first reflection surface, the outer curved surface having a reflection section serving as said second reflection surface and an incident section for transmitting incident light onto said solid immersion lens;

wherein said light that has been made incident on said solid immersion lens through said incident section is reflected by said first reflection surface placed on said inner curved surface, and further reflected by said second reflection surface placed on said outer curved surface, and then converged on a center area of said bottom surface.

11. An apparatus for carrying out at least anyone of recording, reproducing and erasing processes of information on a recording medium, comprising:

a) an optical head, said optical head including:

a-1) a light source for emitting light; and a-2) a reflection converging optical system which includes a solid immersion lens essentially made of a light-transmitting medium, and reflects said light emitted from said light source and taken in said reflection conversion system to converge said light onto a boundary portion of said solid immersion lens, said reflection converging optical system comprising:

a-2-1) a first reflection surface for reflecting said light that has been emitted from said light source and taken in said reflection converging optical system; and a-2-2) a second reflection surface for further reflecting said light reflected by said first reflection surface and for converging said light onto said boundary portion of said solid immersion lens; and b) a signal processing section for processing a recording signal to said recording medium or a reproduced signal from said recording medium, through said optical head;

wherein said first reflection surface and said second reflection surface are formed on said solid immersion lens; and the solid immersion lens has an upper surface and a bottom surface, the upper surface has an incident section for transmitting incident light onto said solid immersion lens and a reflection section serving as said second reflection surface, the bottom surface has a reflection section serving as said first reflection surface on a peripheral area of said bottom surface, the incident section being placed on a peripheral area on said upper surface so that said light that has been made incident on said solid immersion lens through said incident section is reflected by said first reflection surface placed on said peripheral area of said bottom surface, and further reflected by said second reflection surface placed on a center area of said upper surface, and then converged on a center area of said bottom surface.

12. The apparatus according to claim 11, wherein the second reflection surface is formed on a cone-shaped concave section placed on said upper surface.

13. A solid immersion lens that is a light-transmitting medium, comprising:

a first reflection surface for reflecting light taken in said immersion lens; and a second reflection surface for further reflecting said light reflected by said first reflection surface and for converging said light onto said boundary portion of said solid immersion lens;

wherein said solid immersion lens comprises: a bottom surface and an outer curved surface defining an outer shape thereof, and an inner curved surface that is placed inside said solid immersion lens, the inner curved surface having a reflection section serving as said first reflection surface, the outer curved surface having a reflection section serving as said second reflection surface and an incident section for transmitting light taken in said solid immersion lens;

wherein said light taken in said solid immersion lens through said incident section is reflected by said first reflection surface placed on said inner curved surface, and further reflected by said second reflection surface placed on said outer curved surface, and then converged on a center area of said bottom surface.

14. A solid immersion lens that is a light-transmitting medium, comprising:

a first reflection surface for reflecting light taken in said immersion lens; and a second reflection surface for further reflecting said light reflected by said first reflection surface and for converging said light onto said boundary portion of said solid immersion lens;

wherein said solid immersion lens has an upper surface and a bottom surface, the upper surface has an incident section for transmitting light taken in said solid immersion lens and a reflection section serving as said second reflection surface, the bottom surface has a reflection section serving as said first reflection surface on a peripheral area of said bottom surface, the incident section being placed on a peripheral area on said upper surface so that said light taken in said solid immersion lens through said incident section is reflected by said first reflection surface placed on said peripheral area of said bottom surface, and further reflected by said second reflection surface placed on a center area of said upper surface, and then converged on a center area of said bottom surface.

15. The solid immersion lens according to claim 14, wherein the second reflection surface is formed on a cone-shaped concave section placed on said upper surface.

* * * * *